Nov. 9, 1954  F. B. REDMAN  2,693,631
FLOATING CHUCK
Filed Nov. 30, 1951

INVENTOR
FRANK B. REDMAN

BY

ATTORNEY

United States Patent Office 2,693,631
Patented Nov. 9, 1954

2,693,631

FLOATING CHUCK

Frank B. Redman, Manheim Township, Lancaster County, Pa., assignor to Hamilton Watch Company, Lancaster, Pa.

Application November 30, 1951, Serial No. 259,049

3 Claims. (Cl. 29—90)

This invention relates to a floating chuck of a type adapted to grip and turn a workpiece to be polished between two stationary centers.

In the polishing of small watch parts where tolerances are held to 1/10,000 of an inch, the workpiece is very often ruined during the final burnishing operation due to the fact that when set up in the chuck the rotational axis does not coincide with the true axis of the piece. It has been found best to set the piece up between two stationary centers and turn the piece by means of a dog or a separate rotating part which engages teeth in the case of a pinion or some other projecting part. There are, however, some watch parts, such as the balance staff, which have nothing which may be engaged by anything except the jaws of a chuck. It is, therefore, necessary to make a chuck which will grip the piece sufficiently to impart rotational movement and at the same time float with the piece, which may be then held between stationary centers.

The object of the present invention is, therefore, to provide a chuck which will grip the workpiece for rotational movement but which will take the longitudinal axis of rotation of the piece regardless of possible off-centering of the piece in the chuck.

A further object of the present invention is to provide a chuck having a fixed spindle which is provided with a fixed support for a workpiece and jaws which will grip a workpiece for rotation, said jaws following the axis of rotation of the workpiece which is held between stationary centers.

It is a still further object of the present invention to provide a floating chuck for a workpiece held between stationary centers which will be semiautomatic in operation.

The invention is shown in the accompanying drawing in which.

Figures 1, 2, 3:
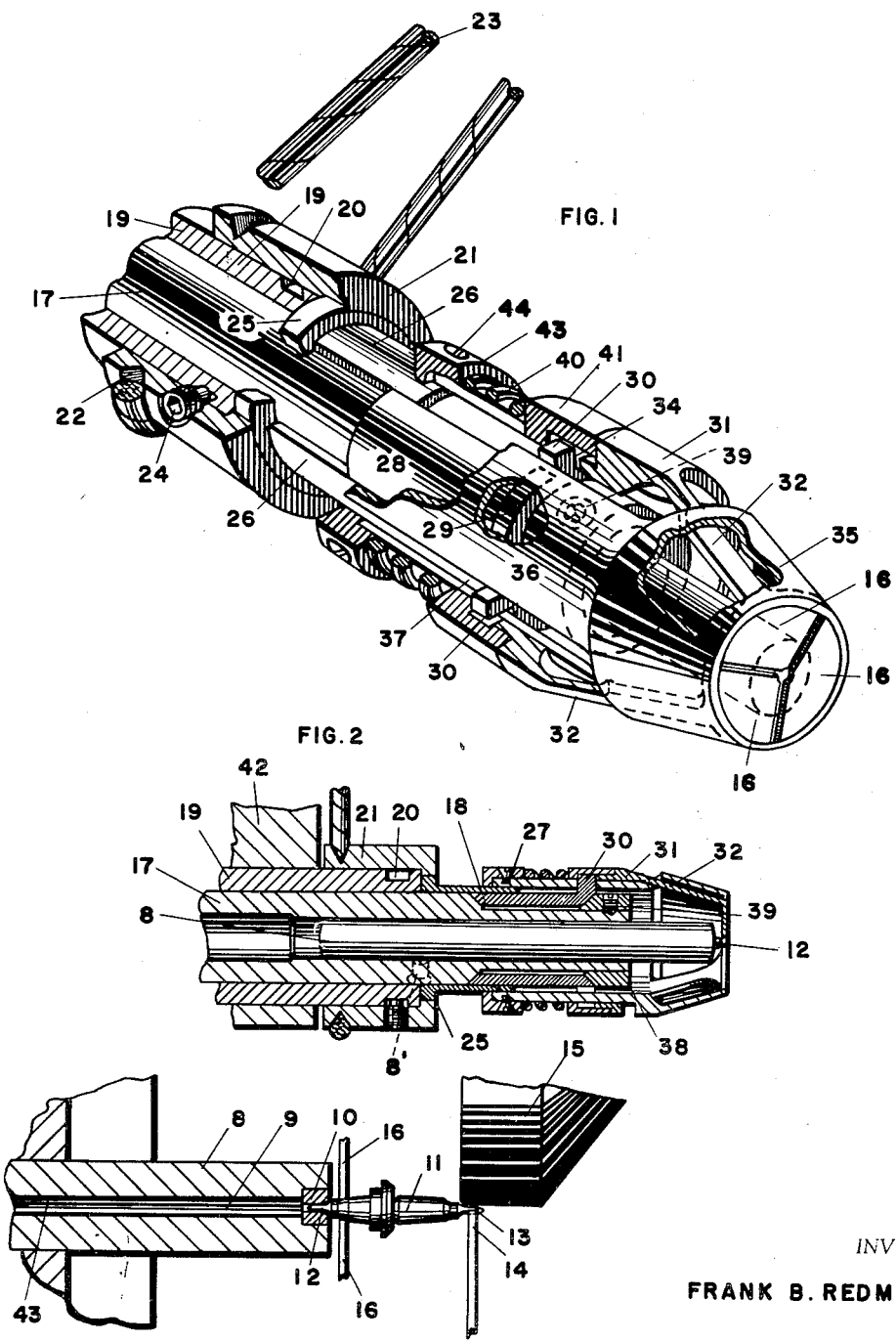
Figure 1 is a perspective having parts broken away of the floating chuck.
Figure 2 is a cross section of the chuck.
Figure 3 is an enlarged detail view showing the workpiece supported between the fixed centers and between the jaws of the chuck.

Referring particularly to Figure 3 in which the apparatus is shown approximately ten times its actual size, a fixed spindle 8 is provided with a central longitudinal opening 9 and an inserted pivot supporting block 10. A workpiece 11 here shown as a balance staff, the pivots 12 and 13 of which it is desired to burnish, is held between the block 10 and a fixed support 14. Directly above the support 14 a rotating burnishing wheel 15 is brought into contact with the end 13 during rotation of the workpiece. Jaw segments 16 of the floating chuck are shown gripping the workpiece.

Referring now to Figures 1 and 2, the fixed spindle 8 has a spindle bearing 17 which is formed with a reduced portion 18 and has slidably mounted thereon a sleeve bearing 19 having an annular groove 20. The spindle 8 is adjusted to proper longitudinal position respective to the spindle bearing 17 and is held by the set screw 8'. Longitudinal movement of the spindle 8 will cause a corresponding movement of the spindle bearing 17. Mounted on the sleeve 19 is a pulley 21 having a groove 22 and driven by a belt 23. A screw 24 passing through the pulley 21 engages the groove 20 of the sleeve 19 and prevents longitudinal movement of the pulley relative to the spindle bearing 17.

A collar 25 is securely attached to the pulley 21 and adapted to turn therewith. Formed integral with the collar are two longitudinally extending tongues 26 which engage the outer surface of the spindle bearing 17 and project over the reduced portion 18. Fitted on the reduced portion is a bearing sleeve member 27 made up of tongues 28, a collar 29 and lugs 30 upstanding from said collar. The sleeve bearing member 27 is held on the spindle bearing 17 by a collar 38 which is secured by a set screw 39 countersunk in the spindle 17. The tongues 26 and 28 interfit to permit rotation to be transferred from the pulley 21 to the bearing 27 by the interfitting tongues and yet permit longitudinal sliding movement of the tongues 28 within the tongues 26.

A nose is made up of a base ring 31, webs 32 and gripping jaw segments 16. The ring 31 is formed with an internal collar 34 which abuts the lugs 30. Overlying the chuck jaw is a hollow conical nose portion 35 formed with a cylindrical skirt 36. The skirt 36 has longitudinal slots 37 which receive and engage the lugs 30, so that rotative movement of the bearing sleeve 28 is transferred through the lugs 30 to the hollow conical nose portion 35 and through friction to the webs 32 in the jaws 16. At the end of the skirt portion 36 a collar 43 is affixed to said skirt by screws 44. Engaging the rim of the collar is a coil spring 40 which surrounds the skirt 36 and abuts against a second collar 41 which in turn abuts the base ring 31 of the jaw.

The action of the chuck may be divided into two categories, the rotative movement and the longitudinal movement. Briefly describing the rotative movement, a motor drives the belt 23 which drives the pulley 21. The pulley in turn is affixed to the collar 25 and its extending tongues 26 so that rotative movement of the pulley is transferred to the tongues 26 which are in engagement with the tongues 28 of bearing sleeve member 27, so that rotation is transferred to the lugs 30 of said bearing. The rotary movement is passed on from the lugs 30 to the skirt 36 of the nose portion 35 from which it is transferred by frictional contact with the webs 32 and the jaw segments 16 to the workpiece which is held in the jaw segments 16.

Longitudinal movement of the spindle 8 opens and closes the jaw segments 16 and holds the workpiece 11 with the pivot 12 firmly seated in the supporting block 10. Assuming that the chuck is unloaded and the spindle 8 in its retracted position, a workpiece is inserted in the block 10 and the spindle 8 moved toward the jaw segments. This movement of the spindle 8 carries with it the bearing 17 which slides in the sleeve bearing 19 held stationary by the supporting head 42. Referring particularly to Figure 2, movement of the spindle 8 to the right moves the bearing 27 and the lugs 30 along with it. The lugs 30 press outward against the base ring 31 and push the jaw segments and web 32 into contact with the nose 35, which draws the spring opened jaw segments together through the tension of the spring 40. This clamping action is sufficient to hold the workpiece, as shown in Figure 3, for turning between the two centers 14. During the rotational movement there is sufficient play between the base ring 31, the collar 41 and the lugs 30 to permit the chuck jaws to float and assume the axis of rotation of the workpiece. Upon the completion of the burnishing operation the spindle 8 is moved to the left and a blast of air delivered through the longitudinal opening 43 to remove the workpiece.

As clearly shown in Figure 1, between the lugs 30 and the inside of the second collar 41 there is both radial and longitudinal clearance. This clearance amounts to .005 inch and is sufficient to permit a slight movement of the chuck permitting the workpiece to be turned about its true axis during the burnishing operation.

What is claimed is:

1. A floating chuck for workpieces, comprising a longitudinal spindle, a stationary bearing carried at the end of said spindle for receiving one end of the workpiece, a spindle bearing movable longitudinally along said spindle, means for locking said spindle to said spindle bearing when in desired position, a sleeve bearing for mounting said spindle bearing for longitudinal movement, a pulley mounted on said sleeve bearing for rotational movement, means for preventing longitudinal movement of said pulley relative to said sleeve bearing, a second sleeve bearing having upturned lugs mounted on said spindle bearing, a floating nosepiece engaging the upturned lugs of said second sleeve bearing, means for transferring the rotation of the pulley to said second sleeve bearing, said rotation being transferred by said lugs to said nosepiece, spring actuated chuck jaws partially housed within said nosepiece and adapted to be opened and closed by the pressure of said nosepiece on said jaws, a stationary post carrying a pivot supporting stationary bearing for the other end of said workpiece, means for moving said spindle and spindle bearing longitudinally to firmly support said workpiece between said stationary bearings, said longitudinal movement serving to clamp said chuck jaws about said workpiece intermediate of the two stationary bearings whereby rotative movement of said chuck is transferred to said workpiece, said chuck assuming the longitudinal axis of the workpiece.

2. A floating chuck for workpieces adapted to be turned between two fixed centers, comprising a spindle, a spindle bearing mounted about said spindle, means for locking said spindle in relative longitudinal position with said spindle bearing, a sleeve bearing about one end of said spindle bearing, a pulley mounted on said sleeve bearing for rotation, means for preventing relative longitudinal movement of said pulley and said sleeve bearing, a second sleeve bearing carried at the other end of said sleeve bearing, said second sleeve bearing formed with longitudinal slots and upturned lugs, a sleeve formed with a pair of longitudinal slots, a sleeve connected to said pulley formed with longitudinal slots, said sleeve and said second sleeve bearing having interfitting sliding engagement with each other, a nosepiece formed with a depending skirt having longitudinal slots and engaging said upturned lugs, a plurality of spring opened chuck jaws partially housed within said nosepiece, a coil spring engaging the lower end of said nosepiece and the base of said jaws, whereby rotational movement of said pulley is transferred through said sleeve and sleeve bearing to said nosepiece and through said nosepiece to said chuck, longitudinal movement of said spindle moving said nosepiece from said chuck to release the workpiece held in said chuck, said nosepiece and said jaws during rotation and clamped position on said workpiece taking the longitudinal axis of said rotating workpiece.

3. In a machine for burnishing the pivots of balance wheel staffs, a spindle having a bearing insert at one end thereof to receive one pivot of the balance staff, a spindle bearing longitudinally movable along said spindle, means for locking said spindle longitudinally respective to said spindle bearing, a sleeve bearing supporting said spindle bearing for longitudinal movement, a pulley mounted on said sleeve bearing for rotation, means for preventing relative longitudinal movement between said pulley and said sleeve bearing, a bifurcated sleeve bearing mounted for rotation on said spindle bearing and formed with an annular collar having upstanding lugs, a second bifurcated sleeve bearing connected to said pulley and slidably interfitting with said first mentioned bifurcated sleeve, a nosepiece formed with a depending cylindrical skirt having longitudinal slots therein for receiving said upstanding lugs, a stationary post formed with a bearing support for receiving the other pivot of said balance staff, a burnishing wheel adapted to contact the upper side of said pivot while on said post, spring opened chuck jaws partially housed within said nosepiece adapted to engage said staff intermediate of said fixed supports, a coil spring carried by said nosepiece and engaging one end of said chuck jaws, said chuck jaws and said nosepiece assuming the longitudinal axis of said staff during rotation.

References Cited in the file of this patent

UNITED STATES PATENTS

| Number | Name | Date |
|---|---|---|
| 16,811 | Stephens | Mar. 10, 1857 |
| 1,468,587 | Weske et al. | Sept. 18, 1923 |
| 2,413,678 | Beverlin | Jan. 7, 1947 |